US010696503B2

(12) United States Patent
Porat et al.

(10) Patent No.: US 10,696,503 B2
(45) Date of Patent: Jun. 30, 2020

(54) TRAY ASSEMBLY FOR USE WITH A CARRIAGE IN A PRODUCT SORTATION SYSTEM

(71) Applicant: GBI, Intralogistics Solutions, Deerfield Beach, FL (US)

(72) Inventors: Joseph Porat, Highland Beach, FL (US); Israel Schechter, Aventura, FL (US)

(73) Assignee: GB Instruments, Inc., Deerfield Beach, FL (US)

( * ) Notice: Subject to any disclaimer, the term of this patent is extended or adjusted under 35 U.S.C. 154(b) by 275 days.

(21) Appl. No.: 15/938,736

(22) Filed: Mar. 28, 2018

(65) Prior Publication Data

US 2019/0300303 A1    Oct. 3, 2019

(51) Int. Cl.
| | | |
|---|---|---|
| B65G 47/38 | (2006.01) | |
| B65G 69/22 | (2006.01) | |
| B07C 3/00 | (2006.01) | |
| B07C 5/38 | (2006.01) | |
| B65G 17/34 | (2006.01) | |
| B07C 5/08 | (2006.01) | |
| B07C 3/08 | (2006.01) | |

(52) U.S. Cl.
CPC .............. *B65G 69/22* (2013.01); *B07C 3/082* (2013.01); *B07C 5/083* (2013.01); *B07C 5/38* (2013.01); *B65G 17/345* (2013.01); *B65G 2201/0214* (2013.01); *B65G 2201/0235* (2013.01); *B65G 2201/0285* (2013.01)

(58) Field of Classification Search
None
See application file for complete search history.

(56) References Cited

U.S. PATENT DOCUMENTS

| | | | | |
|---|---|---|---|---|
| 4,852,715 A | * | 8/1989 | Kmetz ................. | B65G 47/647 198/369.2 |
| 6,762,382 B1 | * | 7/2004 | Danelski .................. | B07C 5/36 198/370.04 |

(Continued)

*Primary Examiner* — Kavel Singh
(74) *Attorney, Agent, or Firm* — Glenn E. Gold, P.A.; Glenn E. Gold (57) ABSTRACT

A tray assembly is provided for use with a carrier in a product sortation system. The tray assembly includes a platform to receive parcels loaded onto the carrier. A pair of movable edge members are disposed at opposite sides of the platform. Each edge member is integrated with a combination including a pair of pivotable support arms and a spring element intermediate of the support arms. Each support arm supports its edge member at one end and is pivotally mounted at another end to a tray framework. The spring element is fixedly mounted at one end to the tray framework and is connected at another end to its edge member in a biasing relationship. In response to an applied load resulting from a parcel bearing down on the edge member, the support arms pivot downward in a manner sufficient to allow the parcel to reach and then rest on the tray platform. At the same time as the support arms pivot, the spring element deflects. After the package is unloaded from the tray platform, the return action of the spring restores the edge members back to their original location, as guided by the support arms.

20 Claims, 9 Drawing Sheets

(56) References Cited

U.S. PATENT DOCUMENTS

| | | | | |
|---|---|---|---|---|
| 8,763,785 B2 * | 7/2014 | Schwardt | ............... | B65G 47/52 |
| | | | | 198/597 |
| 2012/0125735 A1 * | 5/2012 | Schuitema | ........... | B65G 47/647 |
| | | | | 198/370.04 |

* cited by examiner

TRAY ASSEMBLY FOR USE WITH A CARRIAGE IN A PRODUCT SORTATION SYSTEM

FIELD OF THE INVENTION

The present invention relates to product sortation systems, and, more particularly, to a tray assembly for use with a carriage apparatus in a product distribution and sortation system.

BACKGROUND OF THE INVENTION

A system for sorting and distributing products typically includes a carrier device on which a tray is located. Individual parcels loaded onto the tray are then transported to their destination via appropriate movement of the carrier throughout the sorting and distribution network. However, difficulties arise when the package or parcel is too big to fit on a single tray. When this happens, the package can extend beyond the boundaries of the designated platform area on the tray, overhanging one or more of the tray edges. This situation can lead to problems when the ray tilts to discharge the package. Moreover, an oversized parcel can interfere with other system functionalities as the carrier conveys the parcel. For example, the packages typically pass through a sensor station. However, an oversized package may occupy the needed clearance space between the parcel and the sensor elements. One way to address this problem may be to enlarge the platform area, although this solution has the drawback of needing to build customized trays to fit the expected size of the parcel.

Accordingly, there remains a need in the art for an innovation that will overcome the limitations of such conventional sortation systems and the associated problems that remain unsolved.

SUMMARY OF THE INVENTION

The present invention is directed to an innovation that overcomes the deficiencies of the prior art and the problems that remain unsolved by providing a tray assembly that can accommodate oversized parcels.

Accordingly, in one aspect of the present invention, a tray assembly for use with a carrier in a product sortation system includes:

a tray having a platform, the tray having a pair of opposing ends and a pair of opposing sides extending between the pair of opposing ends;

a framework disposed at an underside of the platform;

a pair of edge members each disposed at a respective one of the opposing sides of the tray, each edge member movable relative to the platform;

a pair of support arrangements each associated with a respective one of the edge members;

each support arrangement including a pair of pivotable, spaced-apart support arms each having a mounting end pivotally mounted to the framework and having a support end supporting the associated edge member; and each support arrangement further including a spring element having a mounting end fixedly mounted to the framework and having a free end connected to the associated edge member.

In another aspect of the invention, a tray system for use with a carrier in a product sortation system includes:

at least two tray arrangements operatively configured in serial adjacent relationship to one another;

each tray arrangement including a tray having a platform, the tray having a pair of opposing ends and a pair of opposing sides extending between the pair of opposing ends, a framework disposed at an underside of the platform, a pair of edge members each disposed at a respective one of the opposing sides of the tray, each edge member movable relative to the platform, and a pair of support combinations each associated with a respective one of the edge members, each support combination including a pair of pivotable, spaced-apart support arms each having a mounting end pivotally mounted to the framework and having a support end configured to support the associated edge member, and further including a spring element having a mounting end fixedly mounted to the framework and having a free end connected to the associated edge member.

In another aspect of the invention, a tray system for use with a carrier in a product sortation system includes:

at least two tray arrangements operatively configured in serial adjacent relationship to one another;

each tray arrangement including a tray having a platform, the tray having a pair of opposing ends and a pair of opposing sides extending between the pair of opposing ends, a framework disposed at an underside of the platform, a pair of edge members each disposed at a respective one of the opposing sides of the tray, each edge member movable relative to the platform, and a pair of support combinations each associated with a respective one of the edge members, each support combination including at least one pivotable support arm each having a mounting end pivotally mounted to the framework and having a support end configured to support the associated edge member, and further including at least one spring element each having a mounting end fixedly mounted to the framework and having a free end connected to the associated edge member.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-4, there is illustrated an exemplary embodiment of a tray assembly, generally designated 100, in accordance with aspects of the present invention. The tray assembly 100 can be integrated with a carriage device for use in a product sortation and distribution system, such as that disclosed in U.S. Pat. No. 9,676,566, which is hereby incorporated-by-reference herein its entirety. In such a product sortation system, tray assembly 100 would be carried by, or otherwise stationed on, a carrier. This carrier, for example, can be operated in a product support position to carry an article loaded onto tray assembly 100, and also operated in a product discharge position to facilitate the transfer of a loaded article to a designated receiving area. As discussed further in connection with FIGS. 9-11, the tray assembly 100 would receive an article meant for sorting and distribution, such as a package, product, parcel, or article of manufacture.

Figure 1:
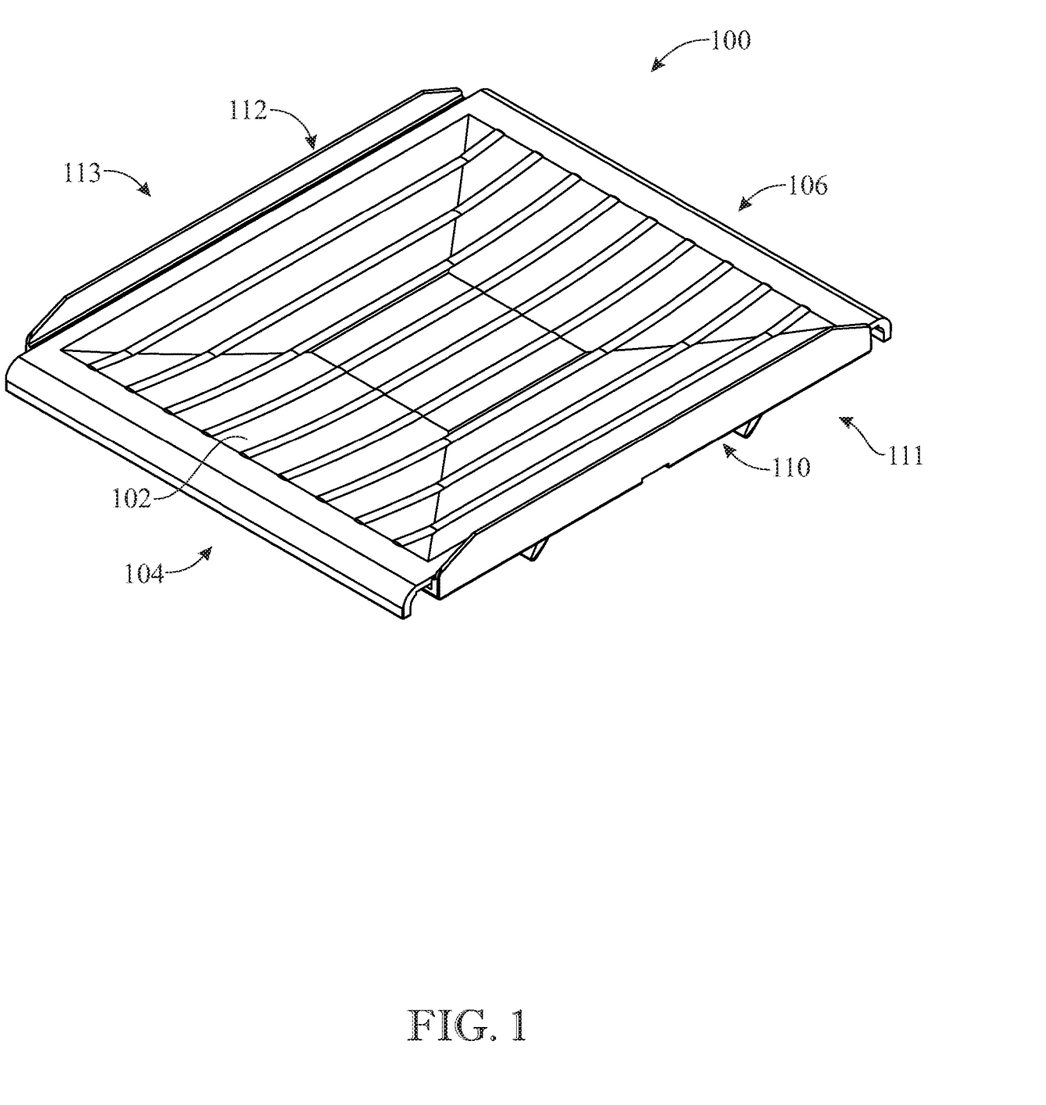
FIG. 1 presents an isometric upper perspective view of a tray assembly for use with a carriage in a product sortation system, in accordance with aspects of the present invention.

As shown in FIG. 1, the tray assembly 100 includes a tray platform 102 that serves as a receiving area for an article loaded onto tray assembly 100. The platform 102 has a generally rectangular configuration, although other geometric configurations are possible. The tray platform 102 includes opposing ends generally designated at 104, 106, e.g., front end 104 and rear end 106. The tray assembly 100 further includes a pair of movable edge members 110, 112 that are disposed at opposing sides 111, 113 of tray platform 102, respectively. These opposing sides 111, 113 extend between the front end 104 and rear end 106. In one form, the edge members 110, 112 are arranged at the respective opposing sides 111, 113 of tray platform 102 in a generally parallel relationship. The dimension extending between the pair of edge members 110, 112 coincides with the direction that an incoming article is conveyed onto tray assembly 100 (i.e., a loading operation). The dimension extending between the front end 104 and rear end 106 coincides with the direction that a loaded article is conveyed from tray assembly 100 (i.e., an unloading operation). For purposes of discussion, and not in limitation, the edge members 110, 112 are spaced-apart along a lateral dimension of tray assembly 100, while the extension between the front end 104 and rear end 106 defines a longitudinal dimension of tray assembly 100. As such, the edge members 110, 112 extend in a longitudinal direction of tray assembly 100 along the respective sides 111, 113. The tray assembly 100 includes a framework 140 that supports tray platform 102. Additionally, framework 140 can be configured to facilitate connection to an underlying carrier for installation in a product sortation system.

Figure 2:
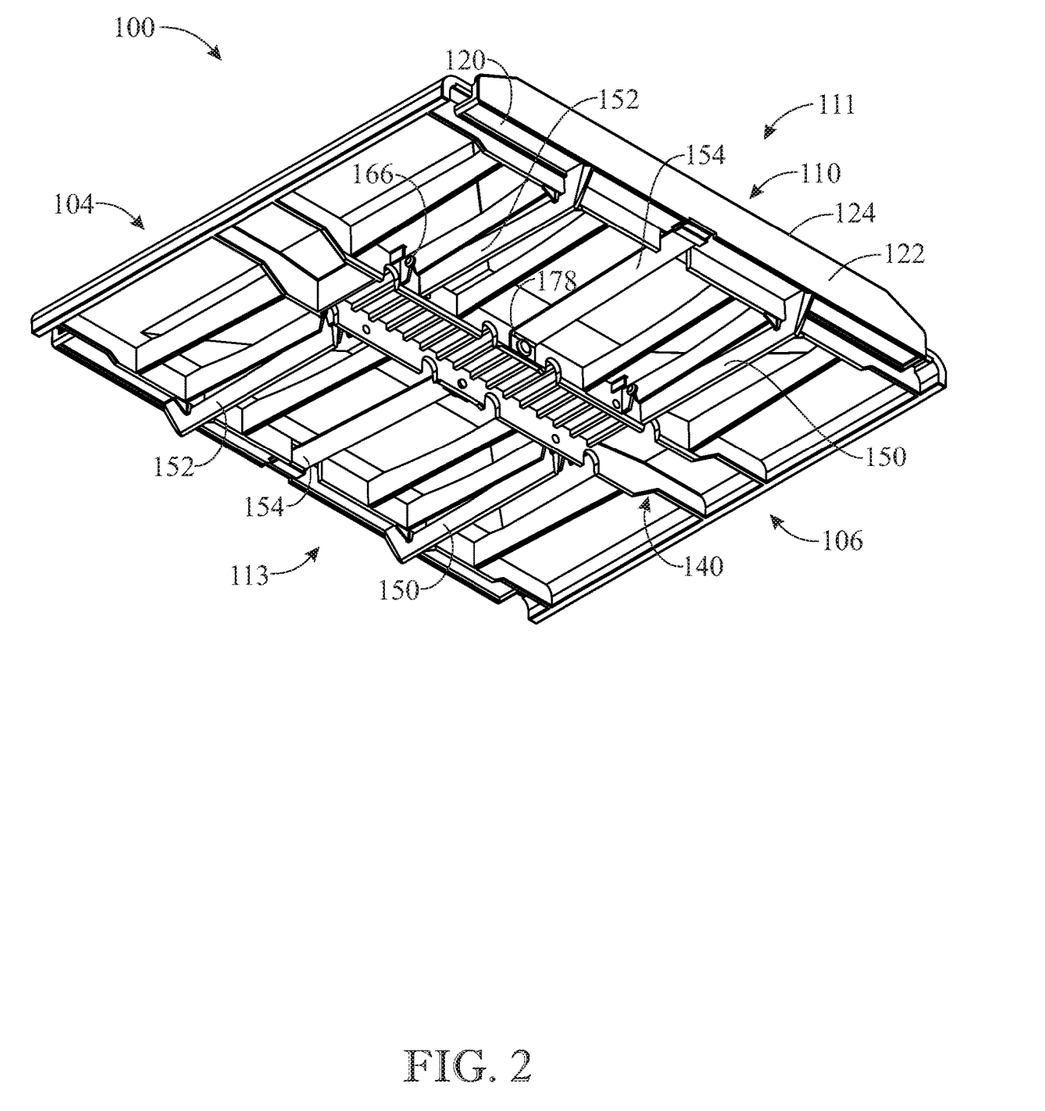
FIG. 2 presents an isometric lower elevation view of the tray assembly originally introduced in FIG. 1, showing an underside of the tray to illustrate the arrangement of parts, as installed, that are configured to support the movable edge members.

The pair of edge members 110, 112 each have a generally elongate construction that extends substantially along, if not the full length, of tray platform 102 at its opposing sides 111, 113. The edge members 110, 112 generally define the outer boundaries at the sides of tray assembly 100. In other forms, the edge members 110, 112 can be considered rail components or any other suitable border structures. As discussed further, the edge members 110, 112 are distinct structures that are movable relative to tray platform 102. In particular, the edge members 110, 112 can be displaced via a pivoting action as a package bears down upon the respective edge member 110, 112. In one form, as depicted in FIG. 2, the edge members 110, 112 each include a bottom side 120 and an upright, lateral side 122 that adjoins bottom side 120 to form a generally L-shaped configuration. The upper end of lateral side 122 defines a rim or lip 124 that is the uppermost boundary of the edge members 110, 112. In the event an oversized article is loaded onto tray assembly 100, the rim 124 of the appropriate edge member 110, 112 will serve as the contact point where the oversized article will bear upon one of the edge members 110, 112. The bottom side 120 and lateral side 122 of edge members 110, 112 each have a generally planar configuration.

Referring now to FIGS. 2-6, the tray assembly 100 includes a pair of support arrangements generally designated at 130, 132, which are each associated with one of the edge members 110, 112, respectively. Referencing edge member 110, the associated support arrangement 130 includes, in combination, a pair of pivotable support arms 150, 152 of similar construction, and a spring element 154. The pair of support arms 150, 152 and spring element 154 together form a set of components (i.e., support arrangement 130) assigned to edge member 110. A like set of components is assigned to edge member 112 as support arrangement 132.

Figure 3:
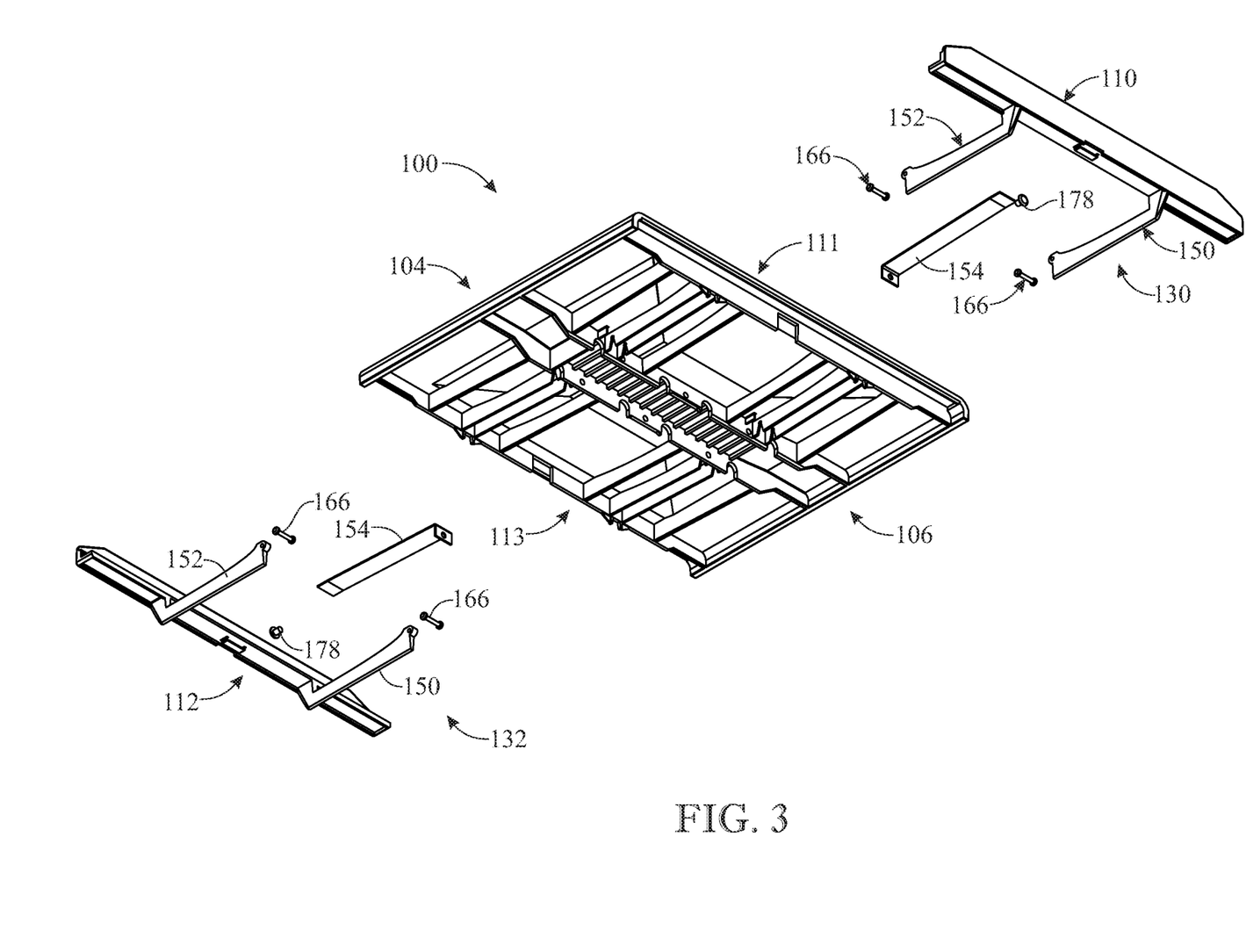
FIG. 3 presents an exploded isometric view of the tray as depicted in FIG. 2, being shown to illustrate each movable edge member in assembled combination with an associated pair of pivotable support arms.
Figure 5:
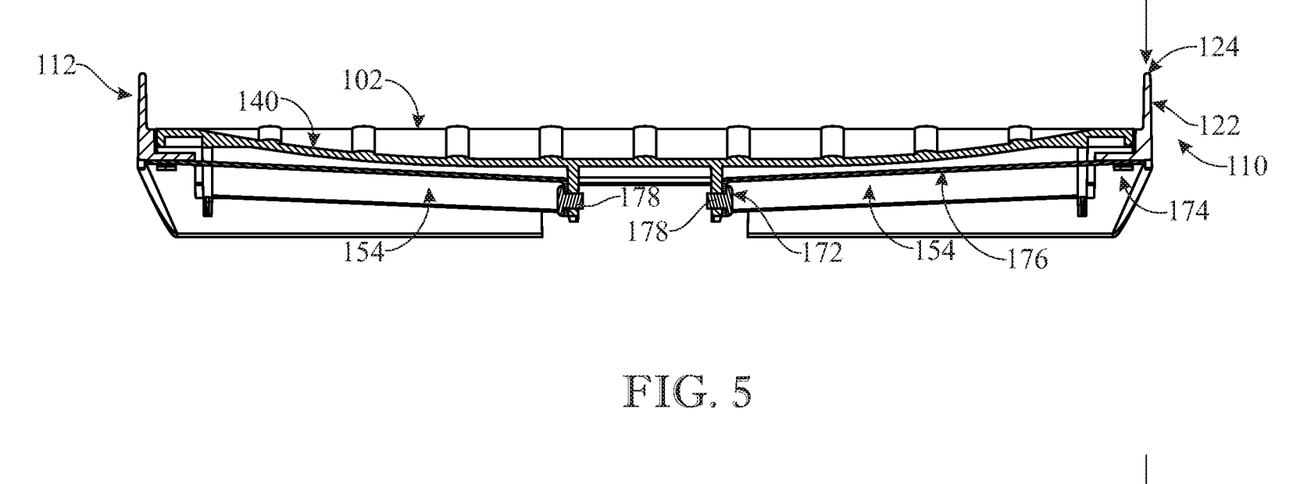
FIG. 5 presents a lateral cross-sectional view of the tray originally introduced in FIG. 1, being shown in an unloaded condition and illustrating the relaxed, non-deflected state of the flat steel spring and the corresponding position of the movable edge member.
Figure 6:
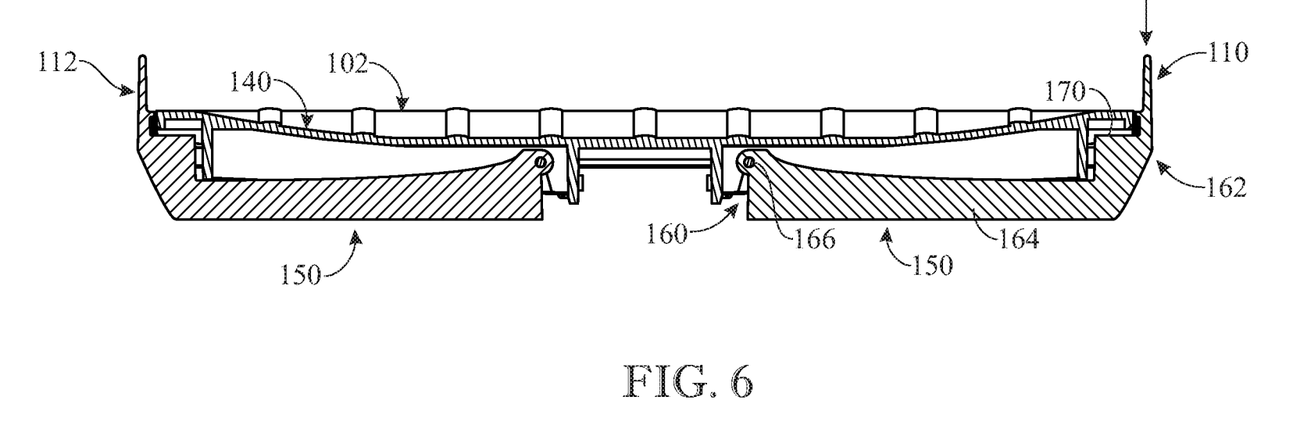
FIG. 6 presents a lateral cross-sectional view of the tray originally introduced in FIG. 1, being shown in an unloaded condition and illustrating the supporting relationship of the pivotable support arm to its associated movable edge member.

As best shown in FIGS. 3 and 6, the support arm 150 includes a mounting end 160, a support end 162, and a body 164 intermediate the ends 160, 162. The support arm 150 is pivotally mounted to framework 140 at its mounting end 160 using any suitable means known to those skilled in the art, such as a hinge 166. The pivoting axis of support arm 150 is generally parallel to the longitudinal axis of tray assembly 100, i.e., the pivoting axis is generally parallel to the direction of extension of the associated edge member 110. The support end 162 of support arm 150 is configured to support edge member 110. For this purpose, for example, the support end 162 may be formed with a suitable bearing surface 170 upon which edge member 110 rests at its bottom side 120. The other support arm 152 assigned to edge member 110 has a similar construction and configuration as support arm 150. The pair of support arms 150, 152 are spaced-apart along the longitudinal dimension of tray assembly 100 to provide a balanced and even support to edge member 110. The pair of support arms 150, 152 are arranged in a parallel relationship to one another. Each support arm 150, 152 has a generally planar construction. As discussed further, the pair of pivotable support arms 150, 152 guides the movement of edge member 110 in the event a load is applied to edge member 100, i.e., the applied load includes a vector acting in a downward direction as shown in FIGS. 5 and 6. This applied load is transferred or communicated to the pair of pivotable support arms 150, 152 via the support relationship provided to edge member 110 by the pair of support arms 150, 152 at the support ends 162 thereof. As a result, the pivoting action of support arms 150, 152 guides the movement of edge member 110 in response to the applied load.

Figure 4:
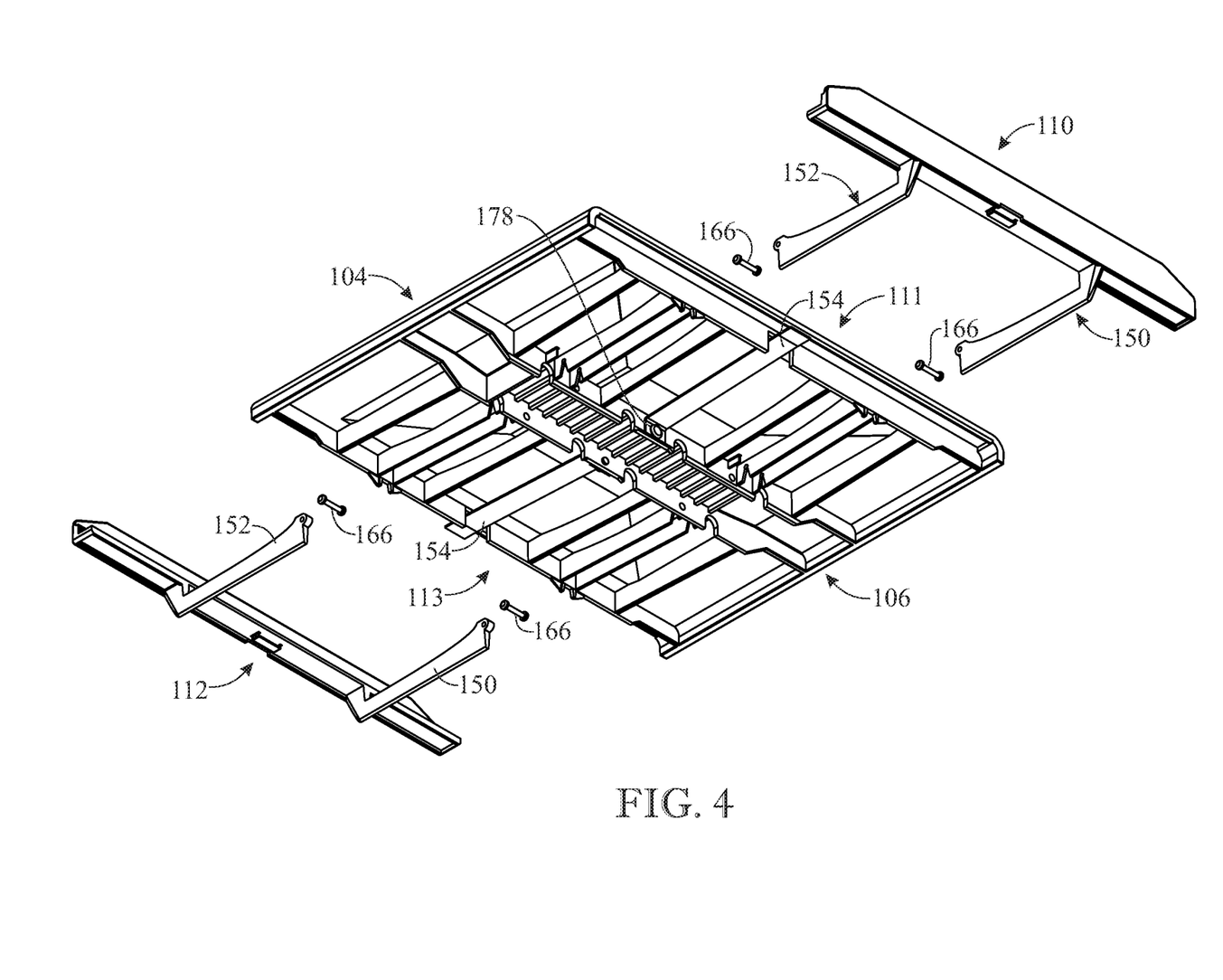
FIG. 4 presents an exploded isometric view of the tray as depicted in FIG. 2, being shown with one of the flat steel springs in its installed condition.

As best shown in FIGS. 3-5, the support arrangement 130 associated with edge member 110 also includes spring element 154. Referencing FIG. 5, the spring element 154 includes a mounting end 172, a free end 174, and a body 176. The spring element 154 is rigidly and fixedly mounted at its mounting end 172 to framework 140 using any suitable means known to those skilled in the art, such as a fastener 178. In one form, the spring element 154 is arranged in a cantilevering configuration. The spring element 154 may be formed as a flat steel spring. The spring element 154 is connected at its free end 174 to the edge member 110 in a biasing relationship. In particular, the spring element 154, when deflected, exerts a biasing action on the edge member 110 that urges edge member 110 in an upward direction. The spring element 154 can be installed in a variety of ways. For example, in one form, spring element 154 can be installed so that in its assembled relationship to edge member 110, spring element 154 is in a relaxed (i.e., non-deflected) state, as best shown in FIG. 5. This relaxed state would be present, for example, when no load is applied to edge member 110. Moreover, the spring element 154 is adequately configured so that, in its quiescent (unloaded) state, spring element 154 is able to hold edge member 110 in such a position to ensure that at least part of lateral side 122 of edge member 110 extends above tray platform 102. Due to its stiffness, spring element 154 maintains edge member 110 in the raised or elevated position relative to tray platform 102, during its relaxed state. In another form, spring element 154 can be installed so that in its assembled relationship to edge member 100, it experiences a slight deflection, though it is modest enough to still ensure that at least part of edge member 110 extends above tray platform 102.

The pair of edge members 110, 112 are only permitted pivoting movement via the respective pivotable support arms 150, and so have no displacement vectors in any other direction within the system of tray assembly 100. Accordingly, in the orientation depicted in FIGS. 5 and 6, the elevated positioning of edge members 110, 112 relative to tray platform 102 serves to form a set of barriers or blocking devices that prevent an article resting on platform 102 from moving off platform 102 in the lateral direction. Both edge members 110, 112 would be in the elevated position shown in FIGS. 5 and 6 when an article rests completely within the space defined by platform 102.

The spring element 154 can be provided in any conventional form, such as any resilient device having a flexing capability. The spring element 154 has a relaxed state and a deflection state. The relaxed state is characterized by the spring element 154 biasing the edge member 110 so that at least a rim 124 of the edge member 110 is above the tray platform 102. The deflection state is characterized by a deflection of the spring element 154 in response to a load bearing upon the edge member 110. In this deflection state, the spring element 154 is able to deflect in a manner sufficient to lower the edge member 110 so that rim 124 of edge member 110 is at least flush with the tray platform 102. In its deflection state, the spring element 154 enters a state of tension that manifests as a biasing activity that exerts an upward urge on edge member 110, which eventually is allowed to be expressed once the load is removed from edge member 110.

The support arrangement 132 associated with edge member 112 includes a combination of parts similar to the support arrangement 130 associated with edge member 110. In particular, the support arrangement 132 includes a pair of pivotable support arms 150, 152 and a spring element 154. FIG. 2 illustrates the installation of components belonging to support sets 130, 132. In an exemplary form, the spring element 154 is disposed intermediate the pair of support arms 150, 152. Additionally, in an effort to promote stability and consistency of operation, the respective components of support sets 130, 132 are arranged in a symmetrical (i.e., mirror-image) relationship to one another across a transverse mid-line of tray assembly 100. Although each support arrangement 130, 132 includes a pair of support arms 150, 152 and a spring element 154, other configurations are also possible. For example, any number or multiple of individual support arms 150 can be provided and arranged in a suitable spaced-apart parallel relationship along the extension of edge member 110. Additionally, any number or multiple of individual spring elements 154 can be used to supply a collective biasing action to edge member 110. In this event, the various spring elements 154 would be appropriately interleaved with the various support arms 150.

Figure 7:
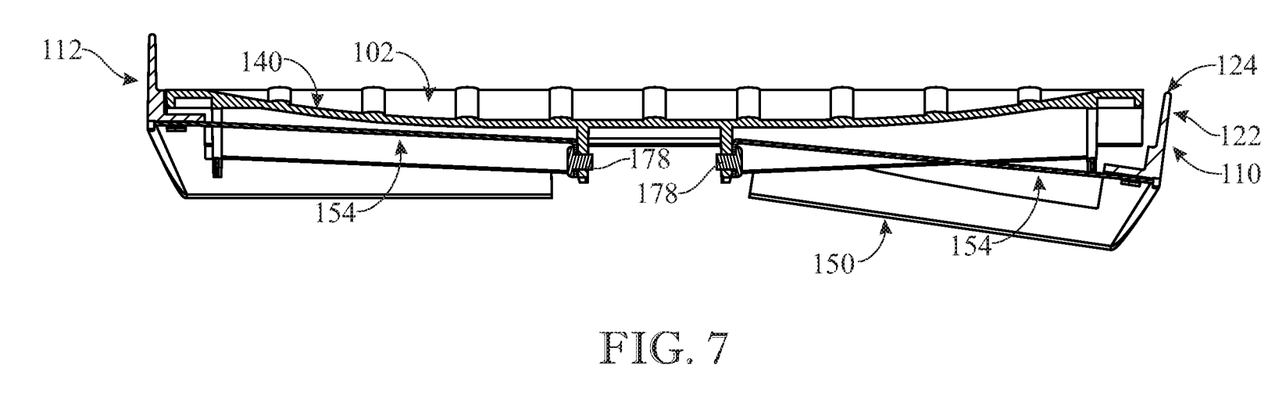
FIG. 7 presents a lateral cross-sectional view of the tray originally introduced in FIG. 1, being shown in a loaded condition compared to the unloaded condition depicted in FIG. 5, and specifically illustrating the deflection of the flat steel spring in response to an applied load bearing upon the movable edge member.
Figure 8:
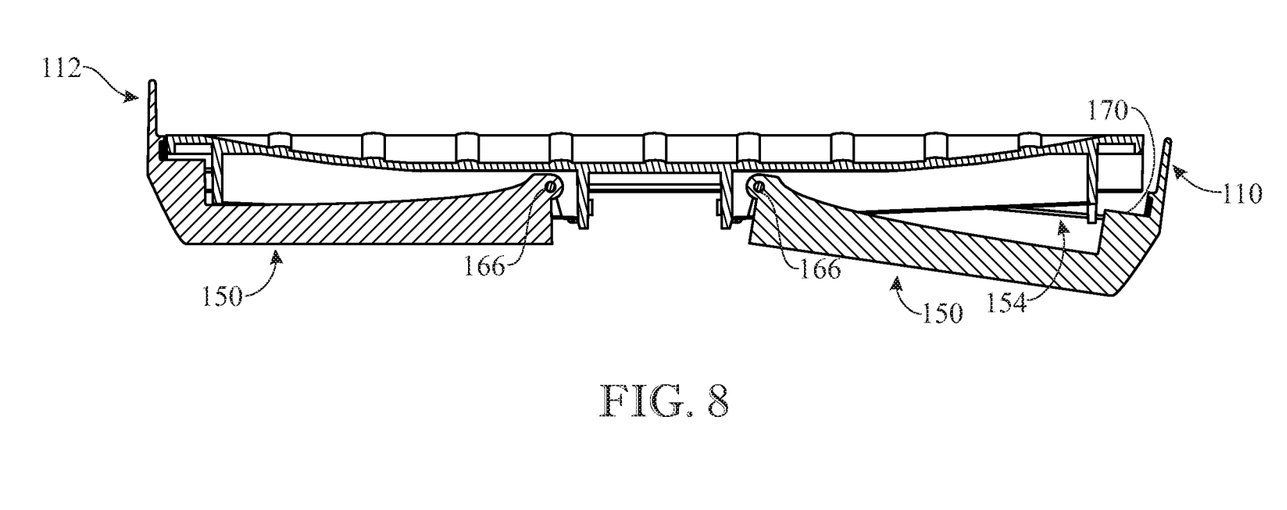
FIG. 8 presents a lateral cross-sectional view of the tray originally introduced in FIG. 1, being shown in a loaded condition compared to the unloaded condition depicted in FIG. 6, and specifically illustrating the pivoting of the support arm and the accompanying rotary movement of the edge member in response to the applied load.

Turning to FIGS. 7 and 8, the tray assembly 100 features the ability to respond to a situation where an article loaded onto tray assembly 100 overhangs one or both of the edge members 110, 112. In the event this happens, an oversized article (not shown) bears down upon edge member 110 at the rim 124 of side 122. When a load is applied in this fashion, it causes two concurrent activities to ensue: the spring element 154 deflects in a downward direction (FIG. 7), and the edge member 110 is displaced in a generally downward direction (FIG. 8) as the support arm 150 pivots in response to receiving the load force that is communicated to its support end 162. The other support arm 152 paired with support arm 150 pivots in a similar fashion. In particular, as the load is applied to edge member 110 at rim 124, this load exertion is communicated to the pair of support arms 150, 152 at their respective support ends 162, which support edge member 110. The pair of support arms 150, 152 respond to the impact of this load by undergoing a clockwise pivoting displacement about their respective pivot axes. Edge member 110, which is supported by the pair of support arms 150, 152, likewise moves in accompaniment to the pivoting rotation of support arms 150, 152. At the same time, the spring element 154, which is connected to edge member 110, deflects in a downward direction. As long as the load is maintained over the edge member 110 at rim 124, the support arm 150 will continue in its pivoted orientation. Likewise, spring element 154 will continue in its deflected position. In this deflected state, spring element 154 remains in tension, so that edge member 110 continues to experience an upward urging from spring element 154. Such a loaded condition would exist, for example, when a parcel is placed on edge member 110. However, once the parcel is transferred off the tray assembly 100 and the load is removed from edge member 110, the deflected spring element 154 attempts to release the tension by flexing back and returning to its relaxed state, where edge member 110 extends at least in part above tray platform 140. Any flexing of spring element 154 causes a corresponding movement of the edge member 110 connected to it. Accordingly, the restoring flex action of spring element 154 is accompanied by a counter-clockwise pivoting action of support arm 150 as it guides edge member 110 in a generally upward direction back to its original unloaded position.

Figure 9:
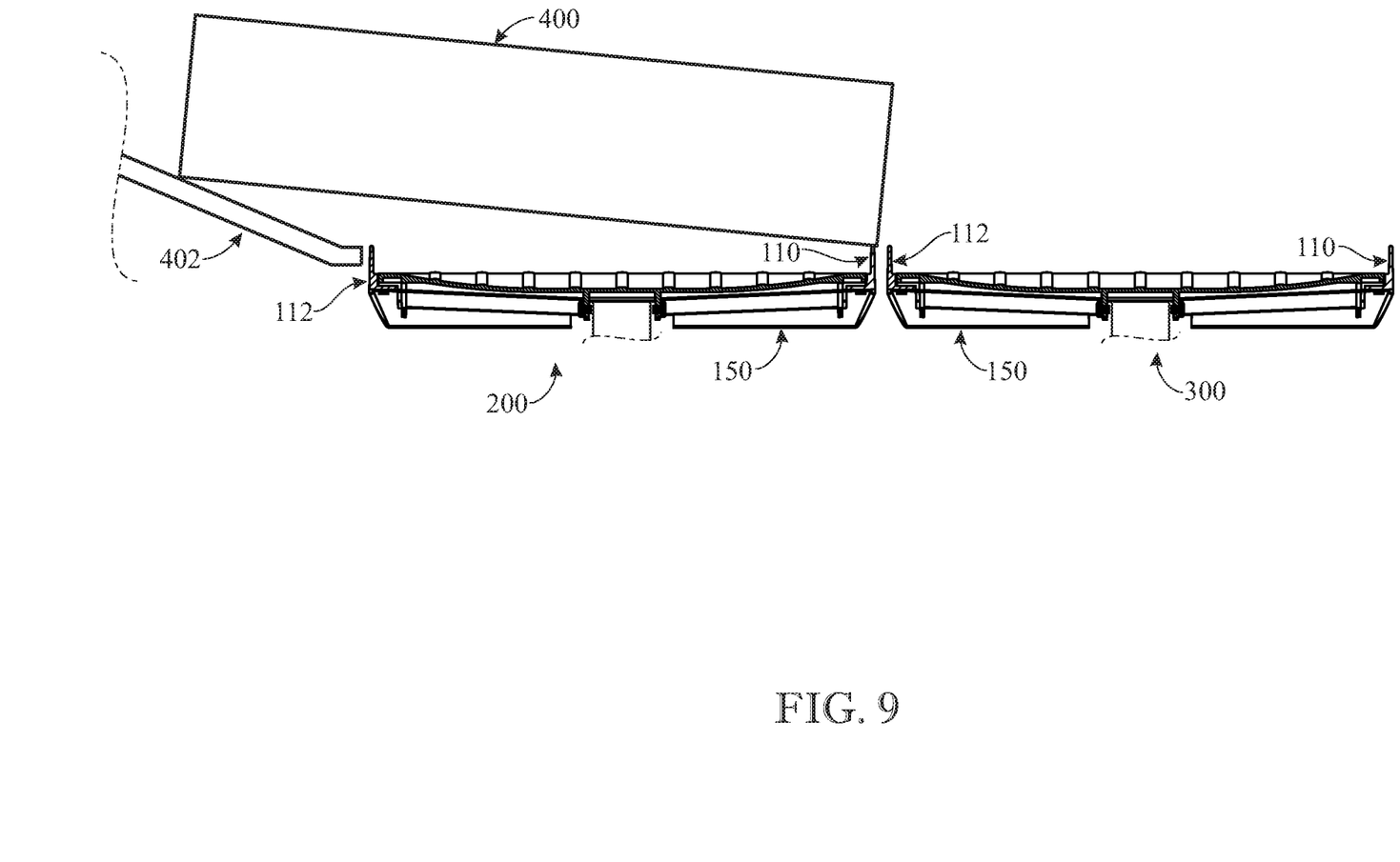
FIG. 9 presents a side elevation view of a dual-tray arrangement for use with a carriage in a product sortation system, according to other aspects of the present invention, being shown in the process of receiving an oversized package in transit that is unable to fit in a single tray.
Figure 10:
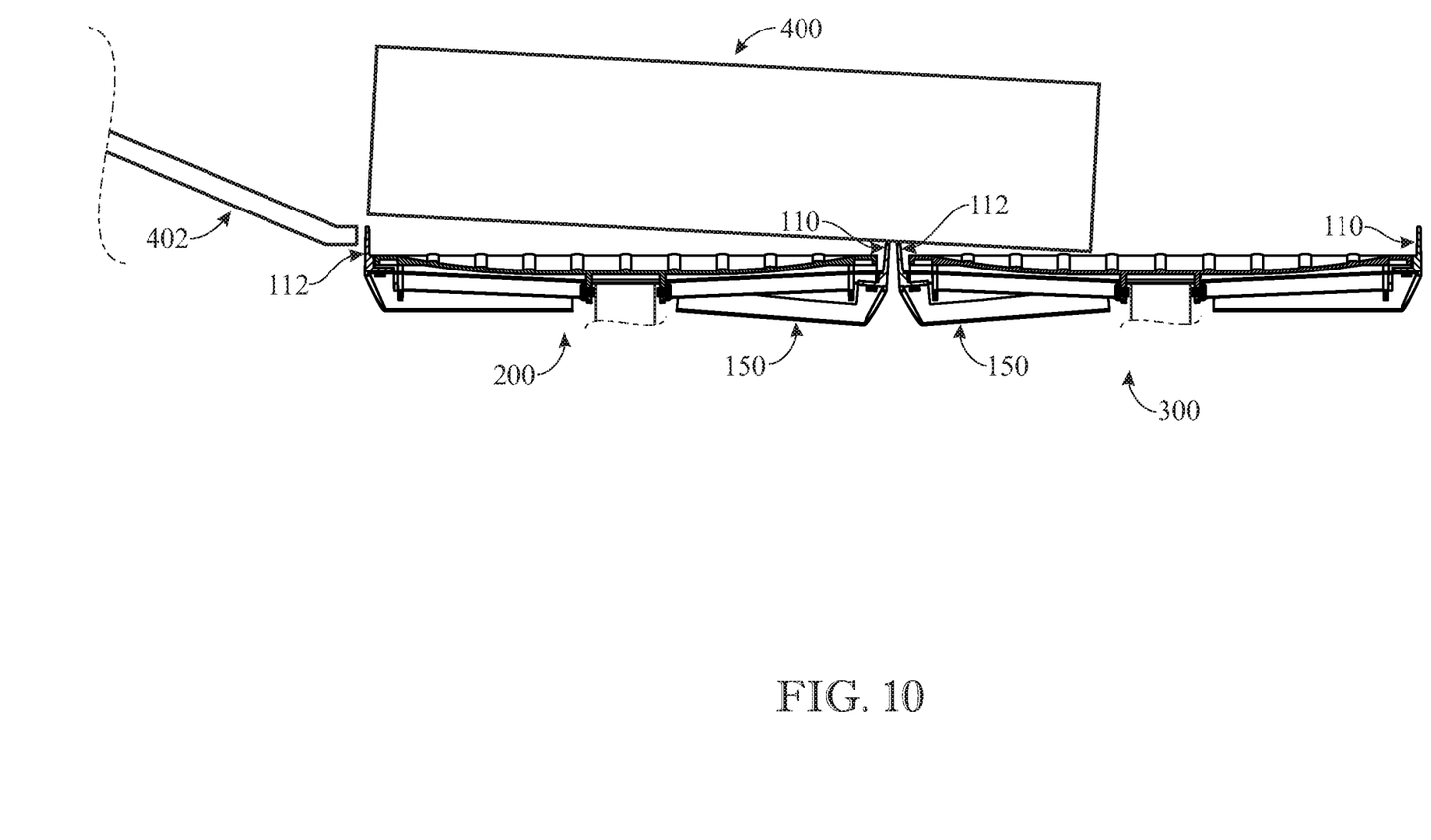
FIG. 10 presents a side elevation view of the dual-tray arrangement originally introduced in FIG. 9, being shown in the process of receiving a package that exceeds the length of the leading tray and spans into the following tray, and specifically illustrating the incipient pivoting retraction of the edge members from adjacent trays in order to let the dual-tray arrangement to accommodate the oversized package.
Figure 11:
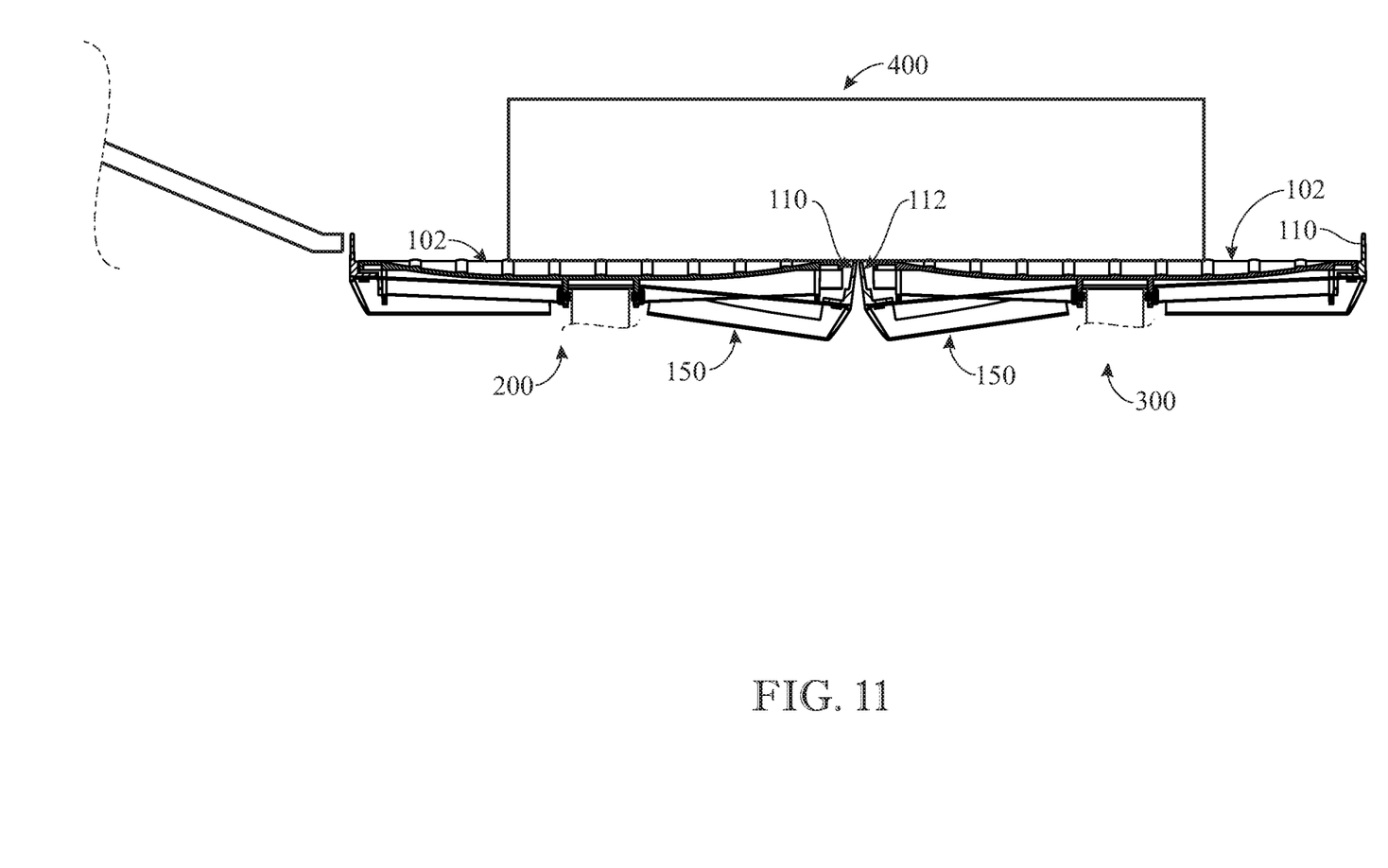
FIG. 11 presents a side elevation view of the dual-tray arrangement originally introduced in FIG. 9, being shown with the oversized package in its resting place spanning the two trays, and specifically illustrating the full pivoting retraction of the edge members from adjacent trays, which continues and terminates the process commenced in the depiction of FIG. 10, so that the package lies on the platforms of both trays.

Referring now to FIGS. 9-11, there is illustrated an exemplary embodiment of a pair of tray assemblies 200 and 300, in accordance with other aspects of the present invention. Each tray assembly 200, 300 is constructed and configured in a manner similar to tray assembly 100 disclosed in FIGS. 1-8. The tray assemblies 200, 300 are aligned in an ordered configuration, which arranges them in an end-to-end relationship. In one form, the tray assemblies 200, 300 are arranged in a serial, adjacent relationship to one another. In particular, the tray assemblies 200, 300 are arranged so that edge member 110 of the first tray 200 is arranged in a generally parallel relationship to edge member 112 of the second, adjacent tray 300.

As shown (FIG. 9), during operation, a parcel 400 is off-loaded from a delivery device generally designated at 402 (e.g., a delivery chute) onto the set of tray assemblies 200, 300 in a side-loading operation. The parcel is oversized and cannot fit into, or be carried by, just one tray assembly. As the parcel 400 advances in the lateral direction across the first tray assembly 200, it first encounters the rim 124 (upper edge) of edge member 110 of tray assembly 200 and then bears down on edge member 110 at this point (FIG. 9). Because of its size, parcel 400 continues to advance in the lateral direction and next encounters the rim of edge member 112 of the second tray assembly 300, likewise bearing down on edge member 112 of tray assembly 300 at this point (FIG. 10). At this stage of the loading operation, parcel 400 is bearing down on both edge member 110 of tray assembly 200 and edge member 112 of the adjacent tray assembly 300, causing a pivoting action of the relevant support arms to commence, i.e., support arm 150 connected to edge member 110 of tray assembly 200 and support arm 150 connected to edge member 112 of tray assembly 300. The other support arms 152 (not shown) paired with these pivoting support arms 150 of tray assemblies 200, 300 undergo a similar pivoting displacement. The pivoting action of these support arms in the adjacent tray assemblies 200, 300 continues until parcel 400 rests on and between the tray platforms 102 of both tray assembly 200 and tray assembly 300 in an overlapping manner (FIG. 11). Both of the tray assemblies 200, 300 now carry the parcel 400 in a shared, unified effort. In the fully loaded state of parcel 400 (FIG. 11), the displaced support arms 150 of tray assemblies 200, 300 have been pivoted to such a degree that the respective rims 124 of the pivoted support arms 150 are flush with the upper surface of the respective tray platforms 102.

Once parcel 400 is loaded onto the set of tray assemblies 200, 300 and resting on their respective tray platforms 102 (FIG. 11), the carriage device (not shown) on which the tray assemblies 200, 300 are carried can now be maneuvered around according to the principles of operation of the product sortation system within which the carriage device is installed. Throughout this maneuvering process, the outermost edge members of tray assemblies 200, 300 (i.e., edge member 112 of first tray assembly 200 and edge member 110 of second tray assembly 300) remain elevated and non-displaced, since no load bears upon them. These outermost edge members function as walls or blocking devices that prevent parcel 400 from shifting laterally off the tray platforms 102 of tray assemblies 200, 300. Once parcel 400 reaches its unloading destination, it is unloaded from the set of tray assemblies 200, 300, for example, by a tilting action that tilts the tray platforms 102 at an angle, i.e., the rear end 106 is raised relative to front end 104 (FIG. 1) so that the parcel 400 slides off the tray platforms 102 via the front ends 104 of tray assemblies 200, 300. Once the parcel 400 is unloaded, the once-pivoted support arms 150 are restored to their original (non-displaced) position by the resilient return action of the spring element 154, which urges the edge members in an upward direction. These edge members are guided back into their original position by the pivoting action of the support arms, which is influenced by the return action of the spring element 154.

Although a pair of tray assemblies 200, 300 are shown, this configuration should not be considered in limitation of the present invention. Rather, it is possible to have any number of individual tray assemblies successively lined up in a side-to-side serial relationship to one another. Among the factors to consider in selecting the set of tray assemblies, the possible or maximum size of an incoming article or parcel will be a principal consideration. For example, based on the expected size of an article, the appropriate number of tray assemblies can be arranged in order to accommodate the article. Each individualized tray 100 (FIGS. 1-8) can be considered a modular design that supports efforts to increase the size of the overall parcel platform area by a scaling operation that simply cascades multiple individual trays into an ordered serial arrangement, following the model shown in FIGS. 9-11, which represents a pair of tray assemblies 200, 300 arranged in adjacent side-by-side relationship.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A tray assembly for use with a carrier in a product sortation system, comprising:
   a tray having a platform, the tray having a pair of opposing ends and a pair of opposing sides extending between the pair of opposing ends;
   a framework disposed at an underside of the platform;
   a pair of edge members each disposed at a respective one of the opposing sides of the tray, each edge member movable relative to the platform;
   a pair of support arrangements each associated with a respective one of the edge members;
   each support arrangement including a pair of pivotable, spaced-apart support arms each having a mounting end pivotally mounted to the framework and having a support end supporting the associated edge member; and
   each support arrangement further including a spring element having a mounting end fixedly mounted to the framework and having a free end connected to the associated edge member.

2. The tray assembly of claim 1, wherein for each support arrangement, the associated spring element is disposed intermediate of the associated pair of support arms.

3. The tray assembly of claim 1, wherein each spring element is configured as a flat spring.

4. The tray assembly of claim 1, wherein each spring element is configured to exert a biasing action on the edge member associated therewith during deflection that urges the edge member in an upward direction.

5. The tray assembly of claim 1, wherein the spring element is configured so that, during a non-deflected state, the spring element locates the edge member associated therewith in a manner such that at least part of the edge member is above the tray platform.

6. The tray assembly of claim 1, wherein each edge member having an elongate construction including a bottom portion and an upright lateral portion adjoining the bottom portion.

7. The tray assembly of claim 6, wherein for each support arrangement, the support end of each respective one of the associated pair of support arms includes a shoulder section operatively configured to support the edge member associated therewith at an underside of the edge member bottom portion.

8. A tray system for use with a carrier in a product sortation system, comprising:
   at least two tray arrangements operatively configured in serial adjacent relationship to one another;
   each tray arrangement including
      a tray having a platform, the tray having a pair of opposing ends and a pair of opposing sides extending between the pair of opposing ends,
      a framework disposed at an underside of the platform,
      a pair of edge members each disposed at a respective one of the opposing sides of the tray, each edge member movable relative to the platform, and
      a pair of support combinations each associated with a respective one of the edge members,
      each support combination including a pair of pivotable, spaced-apart support arms each having a mounting end pivotally mounted to the framework and having a support end configured to support the associated edge member, and further including a spring element having a mounting end fixedly mounted to the framework and having a free end connected to the associated edge member.

9. The tray system of claim 8, wherein the serial relationship between any pair of adjacent tray arrangements is characterized by a generally side-to-side orientation therebetween.

10. The tray system of claim 8, wherein for each support combination, the associated spring element is disposed intermediate of the associated pair of support arms.

11. The tray assembly of claim 8, wherein each spring element is configured as a flat spring.

12. The tray assembly of claim 8, wherein each spring element is configured to exert a biasing action on the edge member associated therewith during deflection that urges the edge member in an upward direction.

13. The tray assembly of claim 8, wherein the spring element is configured so that, during a non-deflected state, the spring element locates the edge member associated therewith in a manner such that at least part of the edge member is above the tray platform.

14. The tray assembly of claim 8, wherein each edge member having an elongate construction including a bottom portion and an upright lateral portion adjoining the bottom portion.

15. The tray assembly of claim 14, wherein for each support combination, the support end of each respective one of the associated pair of support arms includes a shoulder section operatively configured to support the edge member associated therewith at an underside of the edge member bottom portion.

16. A tray system for use with a carrier in a product sortation system, comprising:
   at least two tray arrangements operatively configured in serial adjacent relationship to one another;
   each tray arrangement including
      a tray having a platform, the tray having a pair of opposing ends and a pair of opposing sides extending between the pair of opposing ends,
      a framework disposed at an underside of the platform,
      a pair of edge members each disposed at a respective one of the opposing sides of the tray, each edge member movable relative to the platform, and
      a pair of support combinations each associated with a respective one of the edge members,
      each support combination including at least one pivotable support arm each having a mounting end pivotally mounted to the framework and having a support end configured to support the associated edge member, and further including at least one spring element each having a mounting end fixedly mounted to the framework and having a free end connected to the associated edge member.

17. The tray system of claim 16, wherein the serial relationship between any pair of adjacent tray arrangements is characterized by a generally side-to-side orientation therebetween.

18. The assembly of claim 16, wherein:
the at least one pivotable support arm of each respective one of the pair of support combinations of each respective one of the at least two tray arrangements includes a pair of spaced-apart support arms.

19. The assembly of claim 16, wherein:
the at least one pivotable support arm of each respective one of the pair of support combinations of each respective one of the at least two tray arrangements includes a plurality of spaced-apart support arms; and
the at least one spring element of each respective one of the pair of support combinations of each respective one of the at least two tray arrangements includes a plurality of spring elements interleaved with the plurality of spaced-apart support arms.

20. The assembly of claim 16, wherein each one of the at least one spring element is configured to exert a biasing action on the edge member associated therewith during deflection that urges the edge member in an upward direction.

\* \* \* \* \*